United States Patent Office 3,801,653
Patented Apr. 2, 1974

3,801,653
MANUFACTURE OF ACETYLENE MONOALCOHOLS
Heinrich Pasedach, Knut Bittler, Diethard Francke, and Werner Hoffmann, Ludwigshafen, Germany, assignors to Badische Anilin- & Soda-Fabrik Aktiengesellschaft, Ludwigshafen (Rhine), Germany
No Drawing. Filed Apr. 15, 1971, Ser. No. 134,401
Claims priority, application Germany, Apr. 21, 1970,
P 20 18 971.3
Int. Cl. C07c 33/04, 33/06, 35/08
U.S. Cl. 260—617 E                                                      9 Claims

ABSTRACT OF THE DISCLOSURE

Manufacture of acetylene monoalcohols by reacting acetylenes with carbonyl compounds in the presence of anion exchangers, a nitrogen compound and/or a dialkyl sulfoxide. The compounds manufactured by the process of the invention are valuable intermediates in the manufacture of solvents, odorants, anti-corrosives, vitamins and plant protection agents.

---

This invention relates to a process for the manufacture of acetylene monoalcohols by reacting acetylenes with carbonyl compounds in the presence of anion exchangers, a nitrogen compound and/or a dialkyl sulfoxide.

German Pat. 1,223,364 and U.S. Pats. 2,826,614 and 3,105,098 reveal methods of producing acetylene monoalcohols by reacting acetylene with carbonyl compounds in the presence of anion exchangers containing quaternary ammonium groups at elevated temperatures and pressures. These processes have the disadvantage, which is particularly serious in the case of continuous operation, that the anion exchangers used are deactivated after a certain period by the reaction mixture or oven by small quantities of impurities present in the carbonyl compounds in the form of acids or esters. The reaction must be stopped in order to reactivate the anion exchangers in a separate activating step involving, for example, treatment with an alkali metal hydroxide or an alkali metal methoxide. The yields of product are not satisfactory.

German published application DAS 1,173,457, German Pat. 1,232,573 and W. Ziegenbein "Äthinylierung und Alkinylierung" (published by Verlag Chemie, 1963), pp. 48 to 122 reveal reactions of acetylene with carbonyl compounds in the presence of alkali metal hydroxide and ammonia. Suitable catalysts are alkali metal compounds of the α-alkynol to be produced (Swiss Pat. 420,116). These processes suffer from the drawback that the reaction products contain large proportions of alkali, which must be removed by hydrolysis and filtration.

It is an object of the present invention to provide a new process for making a large number of acetylene monoalcohols in a simple and economical manner, preferably continuously, in good yield and purity.

We have found that acetylene with carbonyl compounds in the presence of anion exchangers containing quaternary ammonium groups, provided that the reaction is carried out in the presence of a nitrogen compound of the general formula:

(I)

in which $R^1$, $R^2$ and $R^3$ may be the same or different and each stands for a hydrogen atom or an aliphatic radical, and in which $R^1$ and $R^2$ may also form, together with the adjacent nitrogen atom, members of a heterocyclic ring, and/or in the presence of a dialkyl sulfoxide.

The reaction may be represented by the following scheme illustrating the use of acetone:

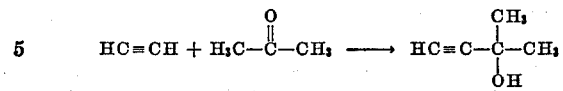

Compared with the cited processes, the process of the invention provides a large number of acetylene monoalcohols in a simple and economical manner, particularly when operated continuously, and, in some cases, in better yield and purity. Impurities present in the starting carbonyl compounds in the form of acids or esters do not interfere with the reaction as in the cited processes. Compared with the known processes which utilize ion exchangers, the process of the invention achieves approximately double the space-time yield. Moreover, hydrolysis of the reaction products is no longer necessary, since the catalyzing groups attached to the ion exchanger cannot contaminate the product. It is surprising that these favorable results are achieved in the absence of alkali and without frequent regeneration of the anion exchanger. Another unexpected feature is that the carbonyl compound can be reacted in the presence of the strongly basic anion exchanger and in the presence of distinctly polar solvents such as ammonia, which favors aldol reactions, virtually without the formation of by-products. Particularly in view of the fact that acetone and ammonia are capable of entering condensation reactions ("Annalen," vol. 174, pp. 133 et seq.; vol. 178, pp. 305 et seq.), one would have anticipated the formation of substantial quantities of by-products.

The starting material used is acetylene or an acetylene substituted, for example, by an aliphatic, cycloaliphatic, araliphatic or aromatic radical. Preferred acetylenes are those of the general formula:

$$HC{\equiv}C-R^4 \qquad (II)$$

in which $R^4$ denotes hydrogen, alkyl of from 1 to 10 carbon atoms, alkenyl of from 2 to 10 carbon atoms, cycloalkyl of 5 or 6 carbon atoms, aralkyl of from 7 to 12 carbon atoms or phenyl.

Suitable carbonyl compounds for use as starting materials are aldehydes and, in particular, ketones of the aliphatic, cycloaliphatic, araliphatic, aromatic or heterocyclic series. Preferred carbonyl compounds are those of the general formula:

(III)

and preferred products are those of the general formula:

(IV)

in which $R^4$ has the meaning stated above, $R^5$ and $R^6$ may be the same of different and each stands for hydrogen, alkenyl of from 2 to 10 carbon atoms, alkyl of from 1 to 10 carbon atoms, cycloalkyl of 5 or 6 carbon atoms, aralkyl of from 7 to 12 carbon atoms, phenyl or a 5- or 6-membered heterocyclic radical containing one nitrogen atom and/or one oxygen atom or a further nitrogen atom, and in which $R^5$ and $R^6$ may also form, together with the adjacent carbon atom, members of a 5- to 8-membered alicyclic or heterocyclic ring containing one nitrogen atom and/or one oxygen atom or a further nitrogen atom. The radicals represented by $R^4$, $R^5$ and $R^6$ may be substituted, if desired, by groups which are inert under the condition of the reaction, for example by alkyl or alkoxy groups of from 1 to 4 carbon atoms.

Examples of ketones are acetone, methylethyl ketone, cyclooctanone, 2-methylhepten-2-one-6, acetophenone, benzophenone, methylvinyl ketone, cyclohexanone, N-methyl piperidone, geranyl acetone and 2-methylhepten-1-one-6. Examples of aldehydes which may be used are formaldehyde, acetaldehyde, citral, benzaldehyde, piperonal, crotonaldehyde, n- and iso-butyraldehyde and 2-ethylhexanal. In addition to unsubstituted acetylene there may be used substituted acetylenes such as propyne, butyne, phenylacetylene, vinyl acetylene, cyclohexylacetylene and benzylacetylene.

The carbonyl compounds may contain up to 5% by weight of the corresponding acids or esters as impurities. In general, the unsubstituted or substituted acetylene and the carbonyl compound are used in a molar ratio of from 1:1 to 5:1.

Preferred nitrogen compounds of the Formula I are those in the formula of which $R^1$, $R^2$ and $R^3$ are the same or different and each stands for hydrogen, alkyl or aliphatic acyl of from 1 to 7 carbon atoms, and $R^1$ and $R^2$ may also form, together with the adjacent nitrogen atom, members of a 5- or 6-membered heterocyclic ring containing one nitrogen atom and/or one oxygen atom or a further nitrogen atom and also containing, if desired, a carbonyl group. Preferred dialkyl sulfoxides are those having alkyl groups of from 1 to 4 carbon atoms. They said radicals may be substituted by groups which are inert under the conditions of the reaction, for example by alkyl or alkoxy groups of from 1 to 3 carbon atoms, or aliphatic acyl groups of from 2 to 4 carbon atoms. The nitrogen compound of Formula I or the dialkyl sulfoxide are usually used in a ratio of from 1 to 10 and preferably from 1 to 5 moles per mole of carbonyl compound.

The preferred nitrogen compound of Formula I is ammonia, but other compounds, for example, N-methyl pyrrolidone, piperidine, piperazine, morpholine, iminazolidine; dimethyl formamide, diethyl formamide, N-ethyl-N-propyl-acetamide, formamide, iso-butylamine, dimethylamine, N,N-diethyl-N-t-butylamine, tributylamine and heptylamine are also suitable. Examples of suitable dialkyl sulfoxides are dimethylsulfoxide and diethyl sulfoxide.

Suitable anion exchangers are, for example, all commercially available products provided they contain quaternary ammonium groups. The are partially cross-linked organic polymers which are therefore insoluble in the usual solvents such as hydrocarbons, halohydrocarbons, alcohols, ethers and carboxylates. They carry, for example, groups of the structure:

which are attached to the backbone by a carbon atom, the radicals R, R′ and R″ being lower alkyl radicals which may, if desired, be substituted by hydroxy or alkoxy groups. The values of R, R′ and R″ are preferably methyl and β-hydroxyethyl in the commercial products. However, polymers containing groups of the structure:

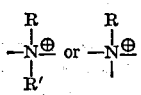

indicated within the macromolecule may also be used. For information on the manufacture of these various strongly basic anion exchangers reference is made to the appropriate chapters of the monograph on "Ionenaustauscher" by F. Helffrich, published by Verlag Chemie, 1959. The counteranion associated with each quaternary ammonium group of the polymer may be, for example, a chloride, bromide, sulfate, acetate, formate or preferably, a cyanide, alcoholate or hydroxyl ion. In general, 0.1 to 1 part of carbonyl compound is used per part of anion exchanger per hour.

In a preferred embodiment of the process of the invention the ion exchanger is reactivated by the method described in German published application P 16 43 710.8–42 during the reaction with compounds consisting of alkali metal or alkaline earth metal cations and exchangeable counterions which catalyze the reaction. This embodiment is conveniently used in cases where the counteranion of the exchanger is not a cyanide, alkoxide or hydroxyl ion. The kind of anion present in the anion exchanger is immaterial for the reaction, but it is preferred to use an anion whose alkali metal salt or alkaline earth metal salt is soluble in alcohol or any other solvent used, as in this case it is a very simple matter to extract from the polymer the salt NaX, for example, as formed according the following equation:

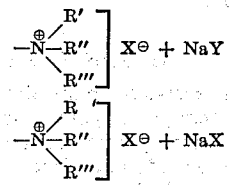

An anion exchanger, which may be in its chloride form for example, may be converted to a more desirable form, for example the alkoxide form, before the reaction by treatment with appropriate counter anions. It is advantageous to remove any water which may be present in the exchanger before the reaction, especially where hydrophobic carbonyl compounds are to be used, which removal is effected by passing organic solvents such as alcohols, e.g. methanol; ethers, e.g. glycol monoether, tetrahydrofuran; acetals, e.g. of formaldehyde, through the exchanger.

In the preferred embodiment the reaction is carried out in the presence of compounds consisting of alkali metal or alkaline earth metal cations and exchangeable counterions which catalyze the reaction. By exchangeable counterions we means appropriate anions according to the definition in Houben-Weyl "Methoden der organischen Chemie," vol. 1, pp. 527 et seq. Due to their exchangeability, these counterions constantly charge the exchanger and reactivate its effective groups which have been deactivated by the reaction mixture. The amount of counterions and thus the amount of activating compounds usually depends on the number of effective groups, the reactivity of the carbonyl compound and the impurities present, as may be determined by preliminary experiment. In general, the amount used is from at least 0.001 and preferably from 0.001 to 0.1 and more preferably from 0.001 to 0.05 moles of activating compound. Suitable activating compounds are, for example, those of lithium, barium, calcium, magnesium and, preferably, sodium and potassium. The preferred exchangeable counterions which catalyze the reaction are hydroxide, cyanide and alkoxide ions. The alkoxides are usually aliphtic, cycoaliphatic or, preferably, aliphatic alcoholates, e.g. methylates, ethylates, iso-propylates, t-butylates, ethylhexylates, benzylalcoholates and cyclohexanolates. It is advantageous to use the alcoholate of the acetylene monoalcohol to be produced.

The reaction, with or without simultaneous reactivation of the exchanger, is conveniently carried out at temperatures between 10° and 80° C. and preferably between 30° and 50° C. At higher temperatures the strongly basic anion exchangers tend to enter decomposition reactions, as is well known. The reaction is generally carried out under pressure, preferably under a pressure of from 5 to 30 atmospheres, batchwise or, preferably, continuously.

In order to dissolve the activating compounds, it is usual to employ organic solvents which are inert under the conditions of the reaction and which may be readily separated during subsequent working up of the reaction mixture, examples being alkanols such as methanol or t-butanol or, preferably, the acetylene monoalcohol which it is desired to produce. Dimethyl formamide or N-methyl pyrrolidone may also be used. The amount of solvent used is generally from 100 to 1,000% by weight of the activating compound. If the reaction is carried out without simultaneous reactivation of the exchanger, it will generally be sufficient to use only the carbonyl compound, the nitrogen compound of Formula I and/or the dialkyl sulfoxide as reaction medium, although the said solvents may also be included.

The reaction may be carried out as follows. Advantageously, the anion echanger containing quaternary ammonium groups, which is used for example in the form of granules having a particle size of from 0.1 to 2 mm., is dehydrated. This is preferably effected by dissolving the water present in the exchanger with the appropriate solvent. Alternatively, drying may be effected by known methods, such as contacting with phosphorus pentoxide in vacuo. When drying is effected using an alcohol, the volume of the exchanger remains virtually constant and no loss of activity occurs. If desired, the exchanger may be treated, before dehydration, with appropriate counterions, for example by slurrying in sodium acetate solution once or a number of times at from 10° to 50° C., to convert the exchanger to a desired form.

The exchanger is charged into a pressure vessel of any desired shape and the starting materials, preferably mixed together, and a solution containing the activating compound are added continuously or batchwise at the specified pressure and then maintained at the specified temperature. Exchangers containing exchangeable counterions which do not, however, catalyze the reaction are activated by the activating compound over an activating period of from approximately 2 to 4 days. Exchangers containing catalyzing counteranions are reactivated continuously during the reaction period. The mixture obtained at the end of the reaction when carried out batchwise or the reaction mixture discharged in continuous operation is then neutralized with an acid, for example formic or adipic acid, and the desired product is isolated by fractional distillation. Unreacted carbonyl compound may be re-used.

If desired, the reaction may be carried out in a similar manner but without the addition of the solution containing the activating compound, i.e. without simultaneous reactivation of the exchanger.

The compounds produced by the process of the invention are valuable intermediates in the manufacture of solvents, odorants, anti-corrosives, vitmains and plant protection agents. For example, partial hydrogenation (German Pat. 1,115,238) of 2,6 - dimethylocten-2-in-7-ol-6 produces the perfume linalool. Likewise, 1-ethyl-cyclohexanol-1 may be mixed with a sperm oil fatty acid salt (manufactured by reacting sperm oil fatty acid diethylene triamine with sperm oil fatty acid) to produce a good anticorrosive agent (German published application DAS 1,172,925). Some of the products, e.g. 3-methylpentine-1-ol-3, are tranquilizers, 3-methylbutin-1-ol-3 is a precursor of vitamin A and isophytol.

In the following examples the parts are by weight unless otherwise stated. The parts by weight relate to the parts by volume as kilograms to liters.

EXAMPLE 1

3 parts by volume of a partially cross-linked styrene polymer which is substituted on the benzene nuclei by groups of the formula:

(i.e. the chloride form of the strongly basic anion exchanger commercially available under the name "Amberlite" IRA 400—"Amberlite" is a registered trademark) are converted to the hydroxide form by slurrying with 30 parts by volume of a 7% w./w. sodium hydroxide solution. The exchanger is then washed until neutral with 10 parts by volume of water. For complete displacement of the water, the exchanger is then treated with 30 parts by volume of methanol. The methanol is mixed with the exchanger to form a slurry and allowed to drain off after a period of from about 15 to 60 minutes. This cycle is repeated as often as is necessary until the drained methanol contains not more than 0.1% by weight of water and until not more than 0.2% by weight of water can be detected in the exchanger. The ion exchanger is then charged into a high-pressure tube. At a pressure of 25 atmospheres and a temperature of from 38° to 40° C. starting materials are pumped into the tube at an hourly rate of 0.3 part of liquid ammonia and 0.6 part of acetone saturated with 0.3 part of acetylene. The reaction temperature is controlled by a cooling circulation system. Isolation of the 3-methyl-1-butyn-3-ol is effected by removing residual gases from the discharged material at 50° C. and subjecting the residue to fractional distillation. There are thus obtained, per hour, 0.75 part of 3-methylbutyn-1-ol-3 and 0.055 part of acetone. The acetone is re-used. The exchanger is still activated after the continuous production of 450 parts of 3-methyl-1-butyn-3-ol over 25 days.

EXAMPLE 2

3 parts by volume of the ion exchanger used in Example 1 in the hydroxyl form are charged into a high-pressure tube after being washed free of water with methanol. At a pressure of 25 atmospheres and a temperature of from 40 to 45° C., starting materials are pumped into the reactor through two feed pumps at an hourly rate of 0.3 part of ammonia and 0.6 part of 6-methyl-5-hepten-2-one saturated with 0.2 part of acetylene. The reaction temperature is controlled by a cooling circulation system. Isolation of the dehydrolinalool is effected by removing the residual gas from the discharged material in the manner described in Example 1 and subjecting the residue to fractional distillation. There are thus obtained, on average, 0.630 part of dehydrolinalool and 0.035 part of 6-methyl-5-hepten-2-one per hour. The exchanger is still activated after continuous production of about 230 parts of dehydrolinalool over 15 days. The catalytic efficiency of the ion exchanger then decreases. By adding 0.050 part per hour of a solution of 0.040 part of dehydrolinaloil and 0.010 part of 30% w./w. methanolic potassium hydroxide or sodium methylate solution the ion exchanger is completely reactivated during the reaction over a period of 1 day. The exchanger is then capable of catalyzing the reaction for a further 15 days without being simultaneously reactivated in situ.

EXAMPLE 3

Following the procedure described in Example 1, the reaction is carried out using 0.500 part of acetone containing 0.25 part of acetylene in the presence of 0.250 part by volume of N-methyl pyrrolidone, per hour. There are thus obtained, per hour, 0.480 part of 3-methylbutyn-1-ol-3 and 0.140 part of acetone. 92 parts of 3-methylbutyn-1-ol-3 are obtained over 8 days with no decrease in the activity of the exchanger.

EXAMPLE 4

Following the procedure described in Example 1, the reaction is carried out using 0.6 part of cyclohexanone containing 0.2 part of acetylene in the presence of 0.3 part of ammonia, per hour. There are thu obtained, per hour, 0.63 part of 1-ethynyl-1-cyclohexanol and 0.065 part of cyclohexanone. 380 parts of 1-ethynyl-1-cyclohexanol are produced over 25 days with no decrease in the activity of the exchanger.

We claim:
1. A process for the manufacture of acetylene monoalcohols of the formula

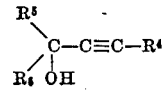

in which R⁴ denotes hydrogen, alkyl of from 1 to 10 carbon atoms, alkenyl of from 2 to 10 carbon atoms, cycloalkyl of 5 or 6 carbon atoms, aralkyl of from 7 to 12 carbon atoms or phenyl, R⁵ and R⁶ may be identical or different and each stands for alkenyl of from 2 to 10 carbon atoms, alkyl of from 1 to 10 carbon atoms, cycloalkyl of 5 or 6 carbon atoms, aralkyl of from 7 to 12 carbon atoms, or phenyl, and in which R⁵ and R⁶ may also form, together with the carbonyl carbon atoms, members of a 5- to 8-membered cycloalkanone ring, an acetylene compound of the formula $$HC \equiv C-R^4$$

in which R⁴ has the meaning given above, is reacted with a ketone of the formula $$R^5-CO-R^6$$

in which R⁵ and R⁶ have the meanings given above, in the presence of a strongly basic anion exchanger polymer containing quaternary ammonium groups and a cyanide, alkoxide or hydroxyl ion associated with each quaternary ammonium group of the polymer as the counteranion and 1–10 mols of ammonia per mol of said ketone at temperatures in the range of 10° to 80° C.

2. A process as claimed in claim 1, wherein the ion exchanger is reactivated during the reaction by means of compounds consisting of alkali metal or alkaline earth metal cations and said exchangeable counterions.

3. A process as claimed in claim 1, wherein the reaction is carried out with the acetylene compound and the ketone present in a molar ratio of from 1:1 to 5:1.

4. A process as claimed in claim 1, wherein the reaction is carried out with the ketone present in a proportion of from 0.1 to 1 part per part of anion exchanger per hour.

5. A process as claimed in claim 1, wherein the reaction is carried out at temperatures between 30° and 50° C.

6. A process as claimed in claim 1 wherein said strongly basic anion exchanger is a partially cross-linked organic polymer having quaternary ammonium groups which are attached to the polymer backbone by a carbon atom and have the formula

wherein the radicals R, R' and R'' are lower alkyl groups or lower alkyl groups substituted by hydroxyl or alkoxy groups.

7. A process as claimed in claim 6, wherein R, R' and R'' respectively are methyl or β-hydroxyethyl.

8. A process as claimed in claim 1 wherein said strongly basic anion exchanger is an organic polymer containing within the macromolecule a group of the formula

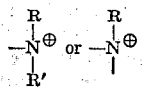

wherein R and R' are lower alkyl groups or lower groups substituted by a hydroxyl or alkoxy group.

9. A process as claimed in claim 1 wherein R⁴ is hydrogen.

References Cited

UNITED STATES PATENTS

| | | | |
|---|---|---|---|
| 2,908,722 | 10/1959 | Casey | 260—642 |
| 3,320,469 | 6/1967 | Spector et al. | 260—641 |
| 3,317,592 | 5/1967 | MacLean et al. | 260—655 H |
| 2,973,390 | 2/1961 | Nednick et al. | 260—631 R |
| 3,105,098 | 9/1963 | Frantz | 260—638 Y |
| 2,826,614 | 3/1958 | Whitfield | 260—638 Y |
| 2,925,363 | 2/1960 | Bailey et al. | 260—638 Y |
| 3,283,301 | 11/1966 | Baldvcci et al. | 260—638 Y |
| 3,496,240 | 2/1970 | Sturzenegger | 260—638 Y |

FOREIGN PATENTS

| | | | |
|---|---|---|---|
| 1,223,364 | 8/1966 | Germany | 260—638 Y |
| 1,027,970 | 5/1966 | Great Britain | 260—638 Y |

JOSEPH E. EVANS, Primary Examiner

U.S. Cl. X.R.

260—239 R, 239 B, 239 BC, 297 R, 333, 340.5, 611 R, 611 A, 615 R, 618 E, 631 R, 631.5, 638 Y